J. BRAY.
VEHICLE WHEEL.
APPLICATION FILED OCT. 23, 1911.

1,077,388.

Patented Nov. 4, 1913.

Witnesses:—
Louis W. Gratz.
Isabel Hall.

Inventor
Joseph Bray,
by Townsend & Graham
his Attorneys.

UNITED STATES PATENT OFFICE.

JOSEPH BRAY, OF ARLINGTON STATION, CALIFORNIA.

VEHICLE-WHEEL.

1,077,388.

Specification of Letters Patent. Patented Nov. 4, 1913.

Application filed October 23, 1911. Serial No. 656,320.

*To all whom it may concern:*

Be it known that I, JOSEPH BRAY, a citizen of the United States, residing at Arlington Station, in the county of Riverside and State of California, have invented a new and useful Vehicle-Wheel, of which the following is a specification.

This invention relates to a vehicle wheel, being particularly designed for use as an automobile wheel of the type commonly termed "spring wheel," and one of the main objects of the present invention is to produce a vehicle wheel of the character described in which the springs are arranged in such a manner as to distribute and absorb shocks received by the wheel.

Other objects and advantages will appear hereinafter from the following description.

Figure 1:
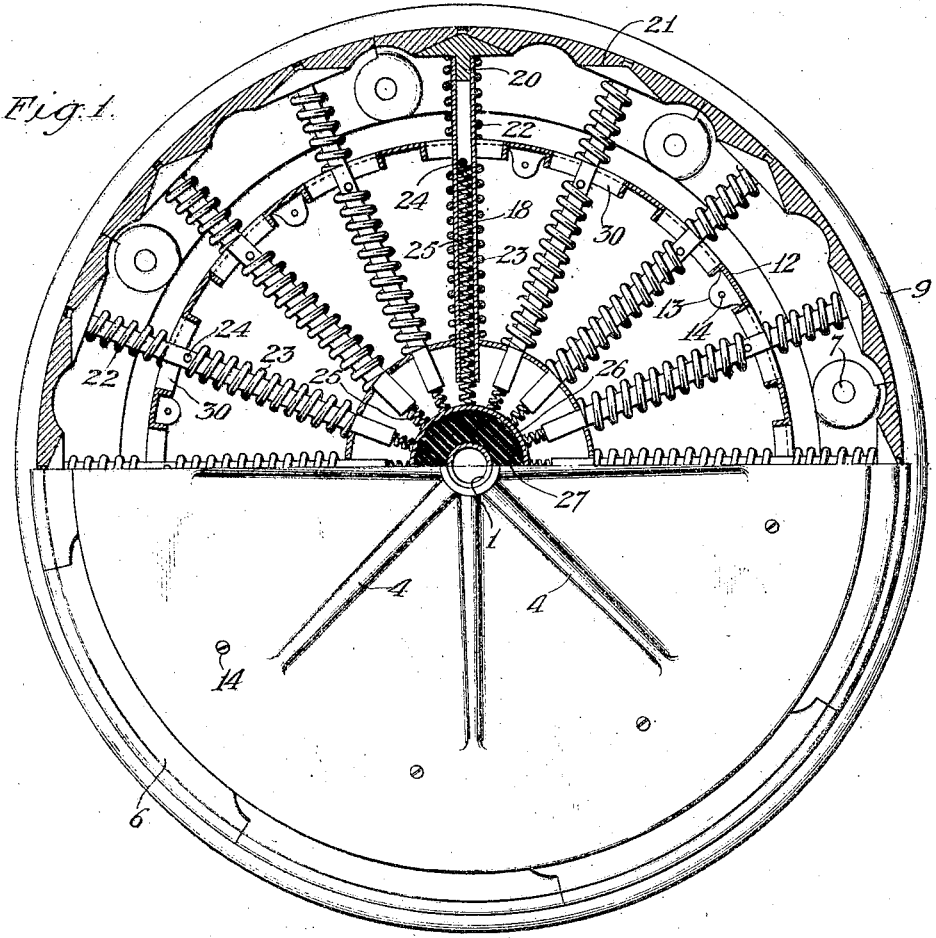
Figure 2:
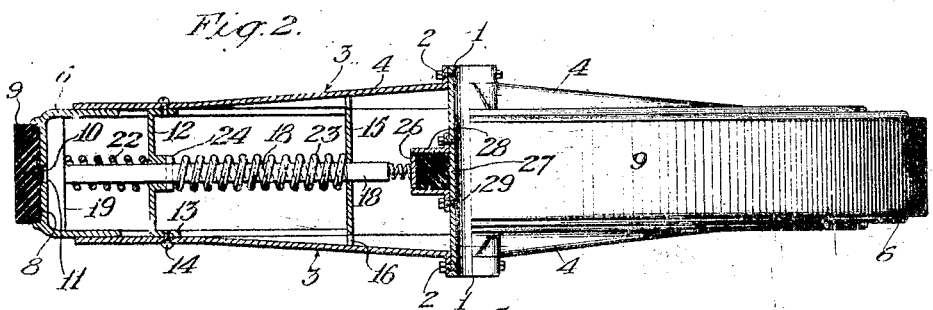
Figure 3:
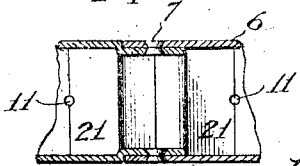

Referring to the drawings, which are for illustrative purposes only: Figure 1 is a side elevation in section, showing a vehicle wheel embodying a form of my invention. Fig. 2 is a plan view, partly in section, of the wheel shown in Fig. 1. Fig. 3 is a fragmentary detail view of a portion of the wheel.

The wheel consists of a hub 1 having secured thereto by suitable bolts 2 a pair of outwardly extending circular plates 3 which are provided with expanded portions 4 forming spokes for stiffening said plates. Slidably mounted within the outer ends of the plates 3 is a series of segmental tire members 6 pivotally connected to each other by means of pins 7. Each tire member 6 comprises a segment U-shaped in cross section and provided with a channel 8 formed in the outer face thereof to receive a tire 9 of rubber or other suitable material. The tire 9 is held from creeping on the plates 3 by means of buttons or lugs 10 formed on the inner face of the tire which engage recesses 11 formed in the tire members 6. The plates 3 are spaced apart by means of an outer ring 12 provided with inturned flanges 13, which flanges 13 are secured to the plates 3 by means of suitable screws 14. In addition to the ring 12 is provided an inner ring 15, which ring 15 has projections 16 which extend into the spokes 4 formed in the plates 3, thereby preventing any relative rotative movement between the ring 15 and the plates 3. The tire members 6 are held in outward or extended position by means of hollow spokes 18, each provided with a head 19 secured to the spoke 18 by means of a stud 20 which enters the outer end of the spoke. The outer face of each head is V-shaped, as shown in Fig. 1, and adapted to engage a similarly formed recess 21 in the inner face of the tire members 6. Each head 19 is held in engagement with a recess 21 in a tire member 6 by means of a coil spring 22 which abuts with its outer end against the inner face of the head 19 and which abuts with its inner end against the outer face of the ring 12, and by means of a spiral spring 23 which abuts with its outer end against a pin 24 which extends through the spoke 18 and which abuts with its inner end against the ring 15. In addition to the two springs 22 and 23 just described, a third spring 25 is provided within the spoke 18 having its outer end abutting against the pin 24 and its inner end abutting against a ring 26 supported on a circular rubber cushion 27 mounted on the hub 1 between two circular flanges 28 secured to the hub by means of bolts 29. Each spoke 18 passes through an elongated opening 30 formed in the ring 12 of a sufficient width to engage the spoke at each side, but having sufficient length to permit the spoke to move therein axially of the wheel. This construction is to permit a relative circumferential movement between the tire members and the plates 3 of the wheel.

A vehicle wheel constructed as above described, when passing over a normal road, would receive impact on the tire 9 and tire members 6 which would cause the tire 9 and tire members 6 to move inwardly, thereby compressing the springs 22, 23 and 25, the springs 22 being supported by a ring 12, the springs 23 being supported by the ring 15 and the springs 25 being supported on the ring 26, thereby distributing the strain to the side plates 3 from the springs 22 and springs 23 and to the hub through ring 26 and cushion 27. Should the vehicle wheel, however, receive a great impact, the outer end of the spokes 18, adjacent to that portion of the wheel receiving the impact, would move inwardly and engage the ring 26, which ring 26 would impart the impact from the spokes 18 to the cushion 27.

What I claim is:—

1. A vehicle wheel comprising a hub, a pair of plates secured to said hub extending outwardly therefrom, a plurality of tire members slidably mounted between said plates, means for pivotally connecting said tire members together, an inner ring between said plates, an outer ring between said plates, spokes slidably mounted in said inner and outer rings, elastic means between said tire members and said outer ring, a pin in each of said spokes, a coil spring on each spoke between the pin thereon and said inner ring, and a coil spring within each spoke between the pin thereon and said hub.

2. A vehicle wheel comprising a hub, a pair of plates secured to said hub extending outwardly therefrom, a plurality of tire members slidably mounted between said plates, each having a V-shaped recess in the inner face thereof, means for pivotally connecting said tire members together, an inner ring between said plates, an outer ring between said plates, spokes slidably mounted in said inner and outer rings, a head secured in the outer end of each spoke adapted to engage a V-shaped recess in a tire member, a coil spring on each spoke between the head thereon and the outer ring, a pin in each spoke, a coil spring on each spoke between said pin and said inner ring, and a coil spring in each spoke between the pin thereon and said hub.

3. A vehicle wheel comprising a hub, a pair of flanges secured to said hub, a rubber cushion on said hub between said flanges, a flat ring on said cushion between said flanges, a pair of plates secured to said hub extending outwardly therefrom, a plurality of tire members slidably mounted between said plates, each tire member having a V-shaped recess in the inner face thereof, means for pivotally connecting said tire members together, an inner and outer ring secured to said plates therebetween, a plurality of spokes slidably mounted in said inner and outer rings, a head secured to the outer end of each spoke, each head having a V-shaped outer face adapted to engage one of said recesses in said tire members, a coil spring on each spoke between said head and said outer ring, a pin in each spoke, a coil spring on each spoke between said pin and said inner ring, and a coil spring within each spoke between said pin and the ring on said cushion.

4. A vehicle wheel comprising a hub, a pair of flanges secured to said hub, an elastic cushion on said hub between said flanges, a pair of plates extending outwardly from said hub, a plurality of tire members slidably mounted between said plates, each tire member having a groove in its outer face and a V-shaped recess in its inner face, a tire seated in the grooves in said tire members, an inner and outer ring secured to said plates therebetween, said outer ring having a plurality of circumferential slots therein, said inner ring having a plurality of perforations therein, a plurality of hollow spokes, each spoke extending through a slot in the outer ring and a perforation in the inner ring, a pin extending through each spoke in contact with the inner face of said outer ring, a head secured to the outer end of each spoke provided with a V-shaped outer face adapted to engage one of said recesses in said tire members, a coil spring on each spoke between the head thereon and the outer ring, a coil spring on each spoke between the pin therein and the inner ring, a coil spring in each spoke between the pin therein and the cushion on said hub.

5. A vehicle wheel comprising a hub, a pair of flanges on said hub, an elastic cushion between said flanges, a ring on said cushion, a pair of plates secured to said hub extending outwardly therefrom, each of said plates having a plurality of radially extending grooves in its inner face, a plurality of tire members slidably mounted between said plates, each tire member having a groove in its outer face and a plurality of V-shaped recesses in its inner face, a tire seated in the grooves in the outer face of said tire members, means for pivotally connecting said tire members together, an inner ring between said plates, a plurality of projections on said ring, each extending into a groove in said plates, an outer ring secured to said plates therebetween, said inner ring having a plurality of perforations therein, said outer ring having a plurality of circumferential slots therein, a plurality of hollow spokes, each spoke extending through one of said radial slots in the outer ring and a perforation in the inner ring, a head secured to the outer end of each spoke adapted to engage one of said V-shaped recesses in the inner face of said tire members, a coil spring on each spoke between the head thereon and the outer ring, a pin on each spoke extending therethrough in engagement with the inner face of said outer ring, a coil spring on each spoke between the pin therein and the inner ring, and a coil spring in each spoke between the pin therein and the ring on said cushion.

In testimony whereof, I have hereunto set my hand at Los Angeles, California, this 6th day of October, 1911.

JOSEPH BRAY.

In presence of—
Louis W. Gratz,
Frank L. A. Graham.